United States Patent [19]
Willhoft

[11] Patent Number: 4,893,656
[45] Date of Patent: Jan. 16, 1990

[54] DIVERTER VALVE

[76] Inventor: Walter Willhoft, P.O. Box 95, Wasco, Ill. 60183

[21] Appl. No.: 303,807

[22] Filed: Jan. 30, 1989

[51] Int. Cl.⁴ .............................................. F16K 11/02
[52] U.S. Cl. .................................. 137/874; 137/625.4; 137/625.45; 137/875; 137/885; 277/198; 277/204; 406/182
[58] Field of Search .................... 137/625.45, 874, 875, 137/885, 625.4; 193/31 R, 31 A; 277/198, 203, 204; 406/182

[56] References Cited
U.S. PATENT DOCUMENTS

| | | | |
|---|---|---|---|
| 2,586,144 | 2/1952 | Benoit | 137/874 X |
| 3,089,515 | 5/1963 | Bochan | 137/874 |
| 3,132,669 | 5/1964 | Feldsted | 137/874 X |
| 4,157,848 | 6/1979 | Smoot | 137/874 X |
| 4,669,505 | 6/1987 | Nelson et al. | 137/874 |

Primary Examiner—Gerald A. Michalsky
Attorney, Agent, or Firm—John L. Schmitt

[57] ABSTRACT

A diverter valve includes a valve body formed with a pair of openings. Inlet ends of a pair of discharge tubes are respectively carried by and extend through these openings. An elongated elastomeric strp then may be wound about each tube extended end to form a gasket. This wound strip is held in place by a clamp. The valve further includes a movable member formed with an opening to carry an outlet end of an intake tube. The movable member is pivotally attached to the valve body by two spaced apart pairs of link bars. As connected, the pairs of link bars are positioned in a parallel relationship. Operatively attached to one end of the movable member is a piston rod of an air cylinder which in turn is attached to the valve body. During use the movable member may be selectively positioned by the air cylinder to align the outlet end of the intake tube end with either discharge tube inlet end. Thus, a material flow may be diverted to either of two remote locations to which outlet ends of the respective discharge tubes are connected. During this flow the gasket forms an effective seal between the aligned tube ends to inhibit any loss of material or entrance of foreign matter exterior of the valve.

10 Claims, 3 Drawing Sheets

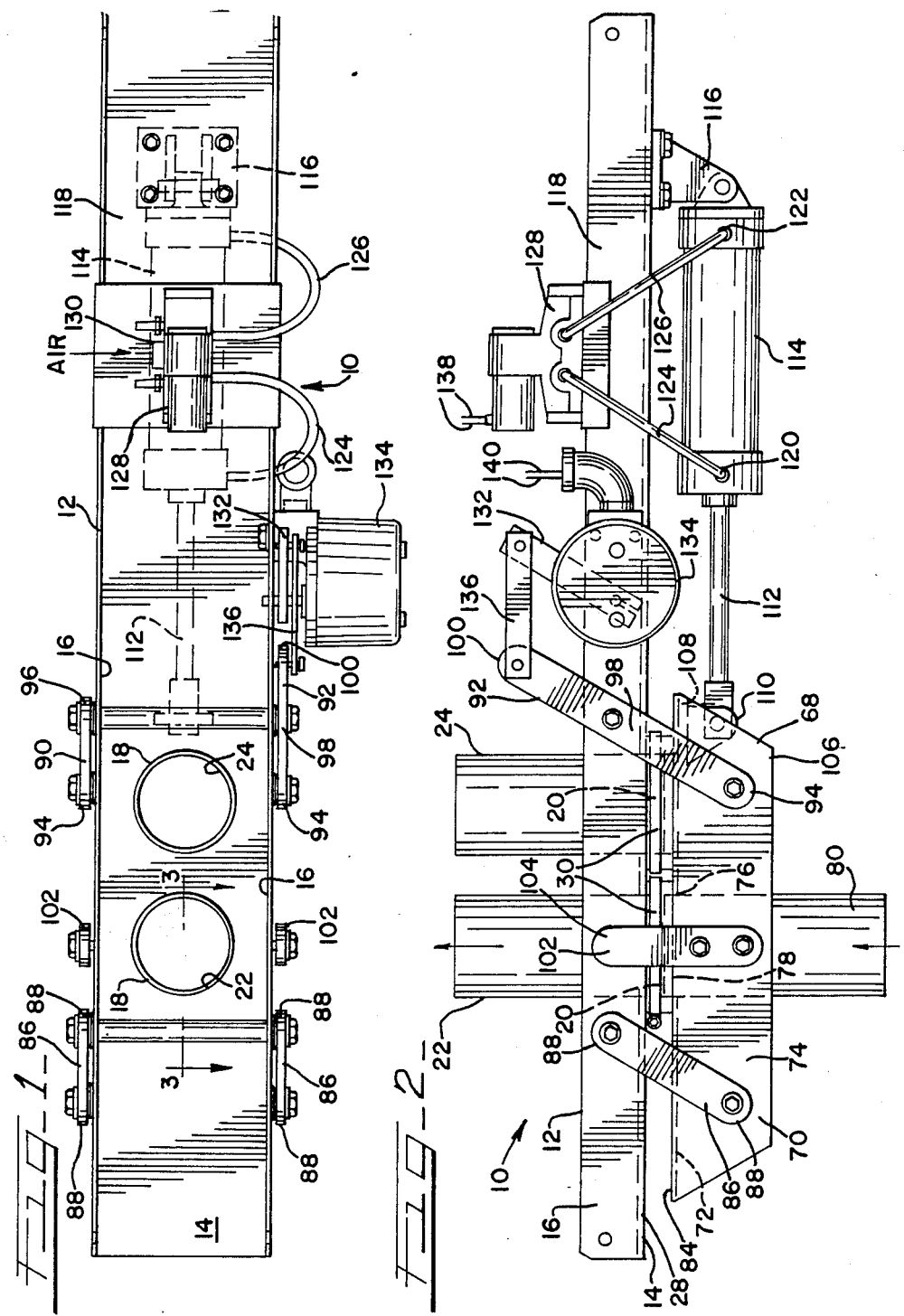

DIVERTER VALVE

BACKGROUND OF THE INVENTION

1. Field of the Invention:

This invention relates to valving devices and more particularly to a class of valves which may be used to divert a material flow between two alternate conduits connecting with different remote locations, for example.

2. Prior Art:

Diverter-type valves which allow a material flow to be directed between several alternate locations have been known and in use for some time.

One early diverter-type valve or stock switch is set forth in U.S. Pat. No. 2,586,144. This valve includes a plate formed with two openings for inlet ends of a pair of discharge tubes. On an outer face of this plate is a set of guides for a slide plate. In the slide plate is a further opening for an outlet end of a flexible coupling end portion of an intake tube. The slide plate may be moved to align the intake tube outlet opening with either discharge tube inlet opening.

Another early valve of this type is set forth in U.S. Pat. No. 3,089,515. This device includes a valve plate formed with openings for two fluid discharge conduits. A movable valve member then is pivotally connected to the plate by two pairs of parallel positioned links located respectively on each side of the discharge openings. The movable member is formed with an opening for an inlet conduit. The inlet conduit opening may be positioned to align with either of the discharge conduit openings by activation of a solenoid operatively attached to one link. This valve further includes an elastomeric, dome-shaped boot. This boot has an outer rim which is attached to an annular flange formed about the outlet openings on the valve plate. The boot then has an inner opening in which an end of the inlet conduit is fitted. This boot seals all three conduit openings from exterior elements.

A further diverter-type valve device has been sold for several years by Chicago Diverter, Inc., of Wasco, Illinois. This more recent valving device was developed by the inventor of the herein disclosed valve and is similar in some respects to the valve device set forth in the '515 patent. The Chicago-Diverter valve, however, uses a solid elastomeric ring positioned about the discharge tube inlet ends instead of a boot for sealing purposes. When an outlet end of the intake tube of the valve is pressed against either ring, a seal is formed between connecting tube ends.

SUMMARY OF THE INVENTION

A diverter-type valve of this invention includes a channel-shaped body defined by spaced apart flanges connected by a web. In this web is a pair of openings for inlet ends of a pair of discharge tubes. Outlet ends of these discharge tubes may be connected to remotely located in-plant material storage spaces, for example. The discharge tube inlet ends may project through the web openings so that an end surface of each tube is spaced from an outer face of the web.

Each outwardly projecting discharge tube inlet end may be encircled by a gasket that has an outer sealing surface that extends beyond the tube end surface. These gaskets may be formed by wrapping an elongated elastomeric strip about each tube inlet end or by overlapping several shorter strips. The elastomeric strip or strips are secured in place by a compressive clamp.

The valve further includes a movable member having a like channel-shaped body. A web portion of the movable member body has an opening for an outlet end of an intake tube. The intake tube outlet end is positioned flush with an outer face of the movable member web. An inlet end of the intake tube may be connected to a remotely located material source storage space, for example a railroad hopper car.

The valve body and the movable member are joined together by two pairs of spaced apart link bars pivotally attached to the respective flanges of the valve body and movable member. The link bar pairs are positioned parallel and on an angle with respect to the valve body and movable member to form a parallelogram-like configuration. This positioning allows the movable member to swing back and forth so that the outlet end of the intake tube may align with either discharge tube inlet end.

The swing action of the movable member may be effected by activation of an air cylinder. This cylinder is attached to an extended end of the valve body with a piston rod of the cylinder then connected to an adjacent end of the movable member.

During use the air cylinder is selectively activated to align the intake tube outlet end with one of the discharge tube inlet ends. The material source storage space then is pressurized to cause material in the space to flow through the intake tube, the valve, the discharge tube and into the inplant storage space. During this flow of material the air cylinder holds the outer face of the movable member against the gasket about the inlet end of the discharge tube. This contact forms a seal that inhibits any loss of material or entrance of foreign matter from thereabout.

When the one in-plant storage space is full, the air cylinder may be oppositely activated to swing the valve movable member to align the intake tube outlet end with the other discharge tube inlet end. Filling of the other in-plant storage space then may begin. Again, the tube ends are maintained in a sealed relationship.

The diverter-type valve of this invention provides several important advantages over other like valves known or in use.

To appreciate these advantages one must understand that theretofore there was no truly satisfactory means to operatively seal the tube ends of the valve. For example, while the boot of the '515 device forms an absolute seal, this boot also entraps a certain amount of residual material. If the valve then were to be used in a system for another material, the boot must be removed and cleaned to prevent any of the first material mixing with the other material. There is no practical way to purge a system with a '515 valve without removing the boot.

Another important point of recognition is that the force applied on the movable member by the air cylinder is in an angular direction. Because of this angular direction, the applied force is resultant in nature and resolves into force components. A first force component is in a direction perpendicular to the sealing surface of the gasket. This first component produces compression and thus promotes sealing. A second component of the applied force is in a direction parallel to the gasket sealing surface. This second component produces shearing distortion and wear of the gasket. Thus, this second force component diminishes sealing. Note further that while an increase of the applied force enlarges the sealing force component, this increase also enlarges the distorting force component. Any improvement in sealing is short lived.

The valve of this invention with its improved gasket overcomes the problems produced by the resultant nature of the applied force. This improvement results in part from the gasket comprising a flexible, elastomeric strip. This strip may be in the form of overlapping spiral shaped convolutions or overlapping concentric rings. Outer edges of the strip cover an enlarged area and form multiple engaging surfaces. When distorted, selective portions of the strip are flexed. However, a sufficient number of the engaging surfaces remain seated to effect sealing. The flexibility and multiplicity of the engaging surfaces of the strip also allow the gasket to seat and therefore seal against a mating surface having irregularities. Therefore, this mating surface need not be machined flat, for example.

The diverter-type valve of this invention with its improved gasket provides several additional advantages as well. First, the gasket may be easily installed and readily replaced. A change in the nature of the material flowing through the valve may require an elastomeric strip having different physical or chemical characteristics. Secondly, the gasket may be reversed when one sealing surface becomes worn. Additionally, the location of the gasket may be readily adjusted to and then maintained in an optimum sealing position. Lastly, the gasket may be readily disassembled, cleaned and then reformed.

DESCRIPTION OF THE DRAWINGS

FIG. 1 is a plan view of a diverter-type valve of this invention.

FIG. 2 is a side elevation view of the valve of FIG. 1.

DESCRIPTION OF THE PREFERRED EMBODIMENT

Figure 3:
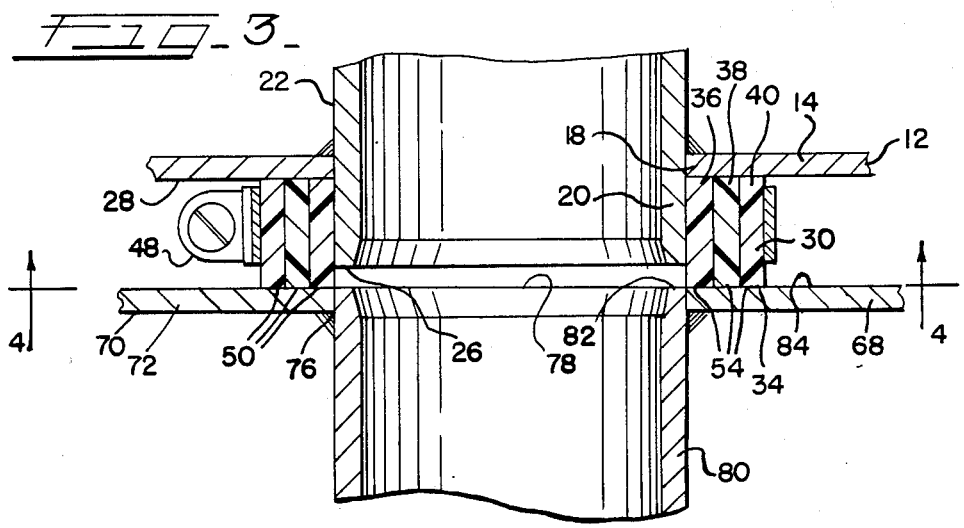
FIG. 3 is a cross sectional view of an outlet end of an intake tube mated with an inlet end of a first of two discharge tubes of the valve as would be seen generally along the line 3—3 of FIG. 1 with gasket of the valve positioned about the inlet end of the discharge tube.

A diverter-type valve of this invention is shown generally in FIGS. 1 and 2 and designated 10. The valve 10 includes a valve body 12 having a channel-like shape defined by a web 14 that connects a pair of spaced apart flanges 16. Formed in the web 14 is a pair of openings 18 positioned in a side-by-side relationship. In each opening 18 is a portion of an inlet end 20 of a first and second discharge tube 22,24.

As shown typically in FIG. 3, the inlet end 20 of the discharge tube 22 extends through its respective web opening 18 so that an end surface 26 of the tube 22 is positioned away from an outer face 28 of the valve body web 14. It should be understood that while the valve tubes 22,24 are shown to be vertically positioned, the valve 10 may be so located to place these tubes 22,24 in any desired orientation.

Figure 4:
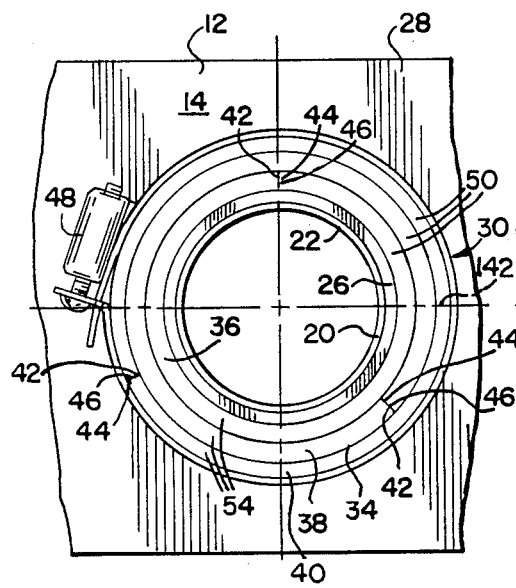
FIG. 4 is a view showing one configuration of a gasket for the valve as would be seen generally along the line 4—4 of FIG. 3.
Figure 5:
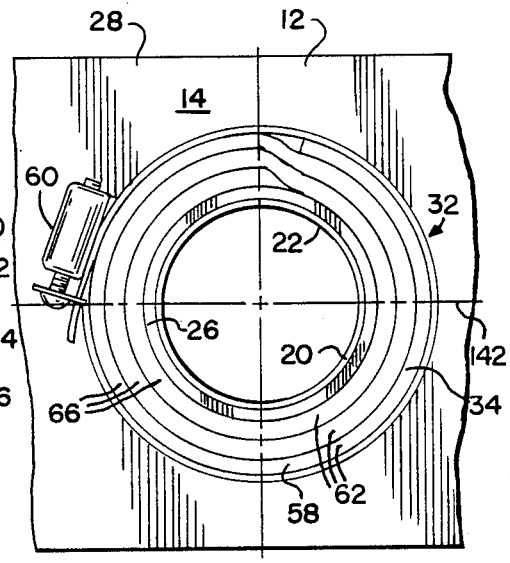
FIG. 5 is a view of another configuration of a gasket for the valve as also would be seen generally along the line 4—4 of FIG. 3.

Positioned about the inlet end 20 of each discharge tube 22,24 adjacent to the web outer face 28 is a gasket. One configuration of this gasket is shown in FIG. 4 and designated 30; another gasket is shown in FIG. 5 and designated 32. For the purposes of this discussion, the gasket 30 is designated as shown in FIGS. 2 and 3. It should be understood that either gasket 30,32 could be so used. In each case an outer sealing surface 34 of these gaskets 30,32 extends beyond the end surface 26 of each discharge tube inlet end 20.

Referring to FIG. 4, the gasket 30 comprises a set of three elastomeric strips, an inner strip 36, an intermediate strip 38 and an outer strip 40. Each strip 36-40 is so dimensioned that ends 42,44 of each strip 36-40 join to form a butt joint 46. The strips 36-40 are so positioned about each discharge tube inlet end 20 that these joints 46 are located on 120 degree intervals thereabout. These strips 36-40 are then secured in place by a compression clamp 48. The clamp 48 is tightened sufficiently to hold the strips 36-40 but still allow the strips 36-40 to remain flexible. As positioned, the outer sealing surface 34 of the gasket 30 comprises outer edges 50 of each elastomeric strip 36-40. These strip outer edges 50 may form a set of three concentrically positioned circular seals 54 when engaged.

As seen in FIG. 5, the gasket 32 comprises one elongated, elastomeric strip 58 that is wrapped about the discharge tube inlet end 20. Once wrapped, this strip 58 is held in place by a like compressive clamp 60. The sealing surface 34 of the gasket 32 comprises an outer edge 62 of this strip 58. This strip outer edge 62 may form helically shaped, convoluted seals 66 when engaged.

Again referring to FIG. 2, the valve 10 further includes a movable member 68. The member 68 also has a channel-shaped body 70 defined by a web 72 which connects a pair of spaced apart flanges. In FIG. 2 one such flange 74 is shown. In the web 72 of the movable member body 70 is an opening 76 for an outlet end 78 of an intake tube 80. An end surface 82 of the intake tube outlet end 78 is positioned flush with an outer face 84 of the web 72, see FIG. 3.

The movable member 68 is operatively connected to the valve body 12 by two pairs of link bars. The first pair comprises two link bars 86 located adjacent to the first discharge tube 22. The link bars 86 are spaced apart so that ends 88 of the link bars 86 may be pivotally attached to the flanges 16,74 of the valve body 12 and movable member body 70 respectively.

The second pair includes a link bar 90 and may include a link bar 92 which is proximately twice as long as the link bar 90. Alternately, the second pair may comprise two link bars 90. Assuming the pair includes the elongated link bar 92, the link bars 90,92 are also spaced apart so that ends 94 may be pivotally attached to the movable member flanges 74. An opposite end 96 of the link bar 90 then is pivotally attached to one of the valve body flanges 16 while a middle portion 98 of the elongated bar 92 is pivotally attached to the other valve body flange 16. An opposite end 100 of the elongated bar 92 extends beyond the flange 16 for connection as will be discussed below.

Note that as connected the link bars 86 of the first pair and the link bars 90,92 of the second pair are positioned in a parallel relationship and on an angle with respect to the outer faces 28,84 of the valve body 12 and movable member body 70. Note further that as positioned and connected, the outlet end 78 of the intake tube 80 aligns with the inlet end 20 of the first discharge tube 22. This link bar connection between the valve body 12 and the movable member body 70 allows the movable member 68 to swing counterclockwise so that the intake tube outlet end 78 also may align with the inlet end 20 of the second discharge tube 24.

Located between the link bars 86 and 90,92 is a pair of guide plates 102. The plates 102 are spaced apart and attached respectively to the movable member flanges 74. Outer ends 104 of the guide plates 102 extend beyond the movable member flanges 74 to be positioned next to but slightly spaced from the valve body flanges 16.

Attached to an end 106 of the movable member 68 on an inner face 108 of the member web 72 is a clevis 110. This clevis 110 is pivotally connected to an end of a piston rod 112 of an air cylinder 114. An end of the air cylinder 114 in turn is pivotally attached to a further clevis 116 that is bolted to an outer end 118 of the valve body 12.

Air inlet ports 120,122 of the air cylinder 114 are then connected by tubes 124,126 to a solenoid operated air valve 128. This air valve 128 is also bolted to the valve body outer end 118. The air valve 128 has an intake port 130 which may be operatively connected to a source of pressurized air. Additionally, the solenoid of the valve 128 is connected by circuit wires 138 to a switching device (not shown) for selective activation of the solenoid valve 128.

As noted above, the link bar 92 may be elongated so that its end 100 extends beyond the valve body flange 16. This end 100 then may be operatively connected to a lever 132 of a limit switch 134 by a connecting bar 136. This limit switch 134, which also may be attached to the valve body 12, then may be connected by circuit wires 140 to an indicating light station (not shown). When the switch for operating the air valve 128 is in a location remote from the valve 10, this indicating light station typically would be located nearby. Thus, an operator of the air valve switch may view which indicating light is energized and thereby determine the alignment position of the intake tube outlet end 78.

During operation the inlet end (not shown) of the intake tube 80 may be connected to a supply of material in a containing space, for example flour in a hopper-type railroad car on a siding next to a bread bakery facility. Outlet ends (not shown) of the discharge tubes 22,24 then may be connected to a first and second flour storage space in the facility. Assuming that the first storage space is to be filled and the intake tube outlet end 78 is aligned with the inlet end 20 of the second discharge tube 24, the air valve 128 is energized to operate the air cylinder 114. The air cylinder 114 then swings the movable member 68 to align the intake tube outlet end 78 with the inlet end 20 of the first discharge tube 22.

The swing action of the air cylinder 114 on the movable member 68 causes the outer face 84 of the movable member web 72 to slide over and press against the sealing surface 34 of the gasket 30 about each discharge tube inlet end 20. As the web outer face 84 slides over the strip outer edges 50 of each gasket 30, portions of the edges 50 are bent to distort the sealing surface 34. Because of this bending, there is less wear of the gasket sealing surfaces 34.

The amount of bending or outer edge distortion is particularly acute in those portions of the strip outer edges 50 aligning with and adjacent to axis 142, see FIG. 4. The axis 142 is in substantial alignment with the line of force of the air cylinder 114. Those strip portions closest to the air cylinder 114 are bent inward toward the tube 22 while the strip portions on the other side of the tube 22 are bent away from the tube 22.

Because the outer edges 50 of the strips 36-40 are both thin and flexible, this distortion does not inhibit sufficient seating with the web outer face 84. Thus, contact between the web outer face 84 and the gasket sealing surface 34 forms multiple, concentrically positioned, circular seals 54. Where the gaskets 32 are used, sufficient portions of the outer edge 62 of the strip 58 of each gasket 32 also remain in contact with the web outer face 84 to form helically shaped seals 66. In both cases strip flexibility also allows operative seating even when the web outer face 84 is not perfectly flat.

During the swing action of the movable member 68 as discussed above, the elongated link bar 92 rotates to change the position of the limit switch lever 132. The indicating light connecting with the limit switch 134 would be energized to produce an appropriate signal of this change of position. Also during this movement of the movable member 68 the guide plates 102 may interact with the flanges 16 of the valve body 12 to maintain proper alignment of the tube ends 20,78.

A flow of material through the valve 10 and connecting tubes 22 and 80 may be effected by pressurizing the hopper car. The amount of pressure typically does not exceed 15 psi. Regardless of which gasket 30,32 is used, the gaskets 30,32 inhibit material in the tubes 22,80 from inadvertently leaking from the valve 10. Foreign matter ambient of the valve 10 also is inhibited from mixing with the material in the tubes 22,80. Additionally, any such foreign matter is inhibited from entering the inlet end 20 of the second discharge tube 24 while not in use since the web outer face 84 also seats against the sealing surface 34 of the gasket 30 or 32 about the inlet end 20 of such.

Complex systems may require more than one diverter-type valve 10. For example, in one such system means for producing material flow may be a blower that is connected downstream from the in-plant material storage spaces. In this case flow into each space is vacuum induced. When the first storage space is full and the flow then is diverted to the second space, it may be necessary to vent the first space to break the vacuum between that space and the blower.

Figure 6:
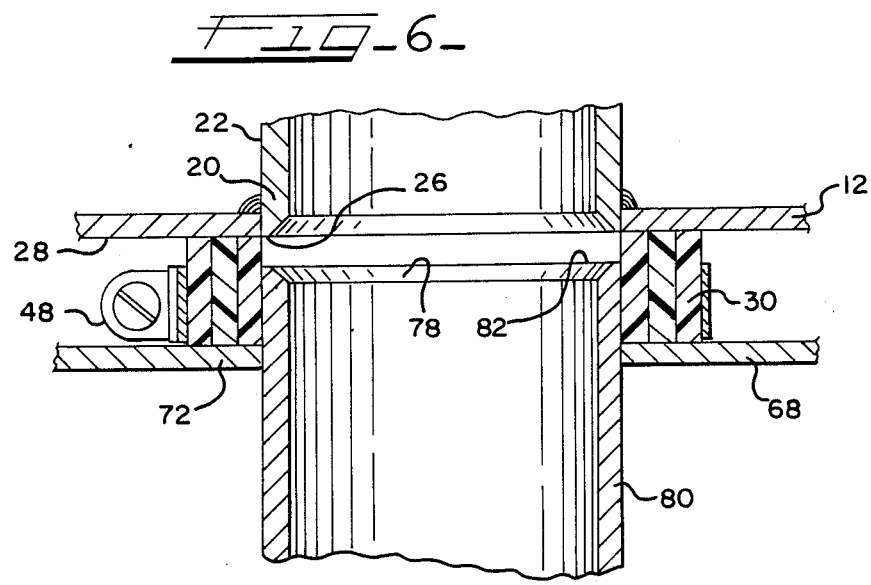
FIG. 6 is similar to FIG. 3 except that the gasket of the valve is shown positioned about the now extended outlet end of the intake tube.

Venting may be effected by placing a modified diverter type valve 10 between the storage spaces and the blower and reversing the valve connections. The discharge tubes 22,24 connect with the storage spaces and become intake tubes; the intake tube 80 then connects with the blower and becomes a discharge tube. As seen in FIG. 6, the valve 10 is modified by positioning the outlet end 78 of the intake tube 80 beyond the movable member web outer face 84. The gasket 30 or 32 then is secured to this outwardly extended outlet end 78. Next the inlet ends 20 of the discharge tubes 22,24 are positioned flush with the outer face 28 of the valve body web 14. Note that as modified, the valve 10 has only one gasket 30 or 32.

The modified valve 10 vents the first storage space when this valve 10 is activated to connect the blower to the second storage space. Venting occurs because the inlet end 20 of the first discharge tube 22 connected with the first storage space is left uncovered. The now gasketed outlet end 78 of the intake tube 80 has swung over to cover the inlet end 20 of the second discharge tube 24 connected to the second storage space. When the modified valve 10 is again activated, the second storage space then also would be vented.

While embodiments, uses and advantages of this invention have been shown and described, it should be understood that this invention is limited only by the scope of the claims. Those skilled in the art will appreciate that various modifications or changes may be made without departing from the scope and spirit of the invention, and these modifications and changes may result in further uses and advantages.

What I claim is:

1. A diverter-type valve comprising:
   a valve body,
   a first and a second discharge tube having inlet ends carried by said body,
   a movable member pivotally attached to said valve body by a pair of spaced apart link bars,
   an intake tube having an outlet end carried by said movable member,
   operative means attached to said movable member to selectively swing said movable member to align said intake tube outlet end with either said first or second discharge tube inlet end, and
   gasket means positioned about said aligned intake tube outlet end and said discharge tube inlet end, said means having a sealing surface forming a series of arcuate shaped seals to inhibit egress from or ingress into said aligned ends,
   wherein material may flow through said valve in a leak resistant and contaminant resistant manner.

2. A diverter-type valve as defined by claim 1 and further characterized by,
   said gasket means comprising several strips of elastomeric material concentrically positioned about said aligned tube ends with flexible outer edges of said strips defining said sealing surface to form said seals into ring-like shapes.

3. A diverter-type valve as defined by claim 1 and further characterized by,
   said gasket means comprising an elongated strip of elastomeric material wound about said aligned tube ends with a flexible outer edge of said strip defining said sealing surface to form said seals into helical-like shapes.

4. A diverter-type valve as defined by claim 1 and further characterized by,
   one said link bar having an extended end for operative connection to limit-type switch means usable in a circuit for indicating a position of said intake tube outlet end.

5. A diverter-type valve comprising:
   a body having a channel-like shaped body defined by a web connecting spaced apart flanges,
   a first and a second discharge tube having inlet ends carried in respective openings formed in said body web,
   a movable member having a channel-like shaped body defined by a web connecting spaced apart flanges,
   an intake tube having an outlet end carried in an opening formed in said movable member web,
   a first and second pair of spaced apart link bars pivotally connecting said movable member to said valve body, said bars positioned to allow said movable member to swing and align said intake tube outlet end with said first or said second discharge tube inlet end,
   a gasket positioned about said aligned ends of said intake and discharge tubes, said gasket having a sealing surface defined by flexible outer edges of a set of concentrically positioned elastomeric strips, and
   operative means carried by said valve and connected to said movable member to selectively effect said alignment of said tube ends,
   wherein, during alignment of said tube ends, said flexible outer edges of said gasket strips may form a set of concentrically positioned, circular shaped seals to inhibit a transfer of material to or from said aligned tube ends.

6. A diverter-type valve as defined by claim 5 and further characterized by,
   said discharge tube inlet ends extending through said valve body web openings for disposition of one said gasket about each said end with said outer edges of said gasket strips positioned beyond an end surface of each said discharge tube inlet end, and
   said intake tube outlet end having an end surface positioned flush with an outer face of said movable member body web,
   wherein said outer edges of said strips of each said gasket may selectively seat against said movable member body web outer face to form sets of said seals.

7. A diverter-type valve as defined by claim 5 and further characterized by,
   said outlet end of said intake tube extending through said movable member body web with said gasket carried thereabout, and said outer edges of said gasket strips positioned beyond an end surface of said intake tube outlet end, and
   said inlet ends of said discharge tubes each having an end surface positioned flush with an outer face of said valve body web,
   wherein said outer edges of said gasket strips may selectively seat against said valve body web outer face to form said seals about one said discharge tube inlet end with said other discharge tube inlet end remaining vented.

8. A diverter-type valve comprising:
   a body having a channel-like shaped body defined by a web connecting spaced apart flanges,
   a first and a second discharge tube having inlet ends carried in openings formed in said body web,
   a movable member having a channel-like shaped body defined by a web connecting spaced apart flanges,
   an intake tube having an outlet end carried in an opening formed in said movable member web,
   a first and second pair of spaced apart link bars pivotally connecting said movable member to said valve body, said bars positioned to allow said movable member to swing and align said intake tube outlet end with said inlet end of said first or second discharge tube,
   a gasket positioned about said aligned ends of said tubes, said gasket having a sealing surface defined by a flexible outer edge of an elongated strip of elastomeric material wound thereabout to be formed into helical-like convolutions, and
   operative means carried by said valve body and connected to said movable member to selectively effect said alignment of said tube ends, wherein during alignment of said tube ends said outer edge of said gasket strip may form seals having spiral-like shapes to prevent a transfer of material to or from said tube aligned ends.

9. A diverter-type valve as defined by claim 8 and further characterized by, said discharge tube inlet ends extending through said valve body web opening with one said gasket carried about each said end and said outer edge of said gasket strip positioned beyond an end surface of said tube inlet end, and said intake tube outlet end having an end surface positioned flush with an outer face of said movable member body web, wherein said outer edge of said strip of each said gasket may selectively seat against said movable member body web outer face to form sets of said seals.

10. A diverter-type valve as defined by claim 8 and further characterized by, said outlet end of said intake tube extending through said movable member body web opening with said gasket carried thereabout, and said outer edge of said gasket strip positioned beyond an end surface of said intake tube outlet end, and said inlet ends of said discharge tubes each having an end surface positioned flush with an outer face of said valve body web, wherein said outer edge of said gasket strip may selectively seat against said valve body web outer face to form said seals about one said discharge tube inlet end with said inlet end of said other discharge tube remaining vented.

* * * * *